United States Patent [19]

Haland

[11] Patent Number: 5,281,780

[45] Date of Patent: Jan. 25, 1994

[54] IMPACT DETECTOR

[75] Inventor: Yngve Haland, Faksterbo, Sweden

[73] Assignee: General Engineering (Netherlands) B.V., Utrecht, Netherlands

[21] Appl. No.: 823,453

[22] Filed: Jan. 21, 1992

[30] Foreign Application Priority Data

Feb. 27, 1991 [GB] United Kingdom ............... 9104063

[51] Int. Cl.$^5$ .................... H01H 35/00; B60R 21/00; B60R 27/00
[52] U.S. Cl. .............................. 200/52 R; 200/61.44; 200/61.45 R; 73/517 R; 180/274; 280/73 S
[58] Field of Search ........................ 200/61.44–61.53, 200/52 R; 280/728–735; 180/271–290; 73/517 R

[56] References Cited

U.S. PATENT DOCUMENTS

| | | | |
|---|---|---|---|
| 2,997,557 | 8/1961 | Gillmor et al. | 200/61.45 M |
| 3,794,136 | 2/1974 | Okada | 200/61.44 X |
| 4,966,388 | 10/1990 | Warner et al. | 280/730 |
| 4,977,388 | 12/1990 | Park | 200/61.44 X |
| 5,072,966 | 12/1991 | Nishitake et al. | 280/730 |
| 5,112,079 | 5/1992 | Haland et al. | 280/730 |
| 5,179,256 | 1/1993 | Haglund | 200/61.44 X |

FOREIGN PATENT DOCUMENTS

| | | |
|---|---|---|
| 0305655 | 3/1989 | European Pat. Off. . |
| 3716168 | 11/1988 | Fed. Rep. of Germany . |
| 1276467 | 6/1972 | United Kingdom . |
| 1437575 | 5/1976 | United Kingdom . |
| 1457549 | 12/1976 | United Kingdom . |
| 2220620 | 1/1990 | United Kingdom . |
| 2225660 | 6/1990 | United Kingdom . |
| 2232936 | 1/1991 | United Kingdom . |

Primary Examiner—J. R. Scott
Attorney, Agent, or Firm—Spencer, Frank & Schneider

[57] ABSTRACT

A motor vehicle is provided with a system for detecting a side impact on the vehicle. The system comprises a reinforcing element located adjacent or engaging the interior of the outer skin of the vehicle in the region of the side of the vehicle. A sensor element is arranged to provide an output signal, in response to a side impact of the vehicle, when or after the reinforcing element is deformed.

14 Claims, 2 Drawing Sheets

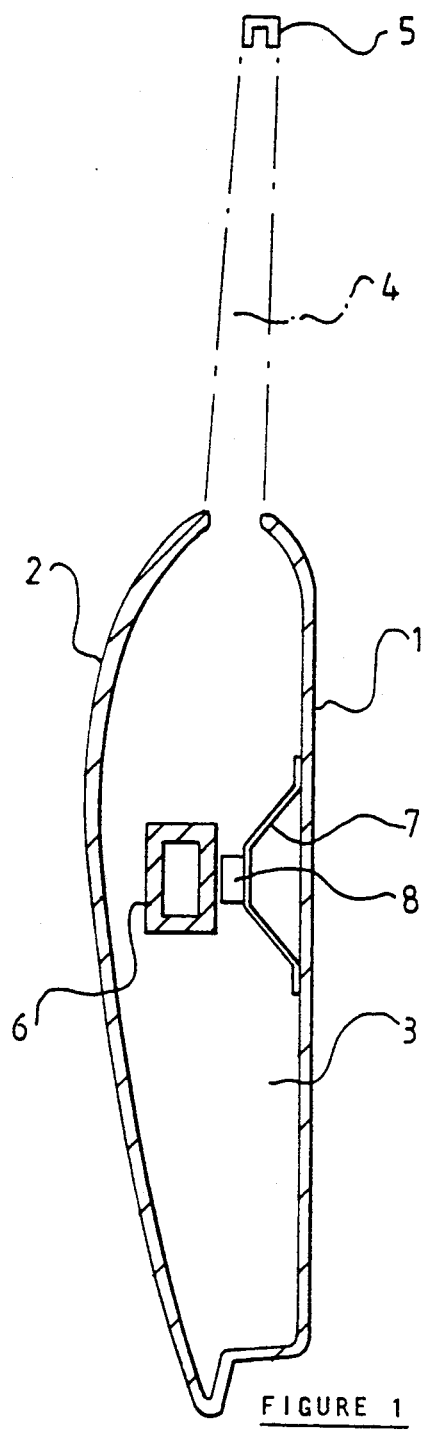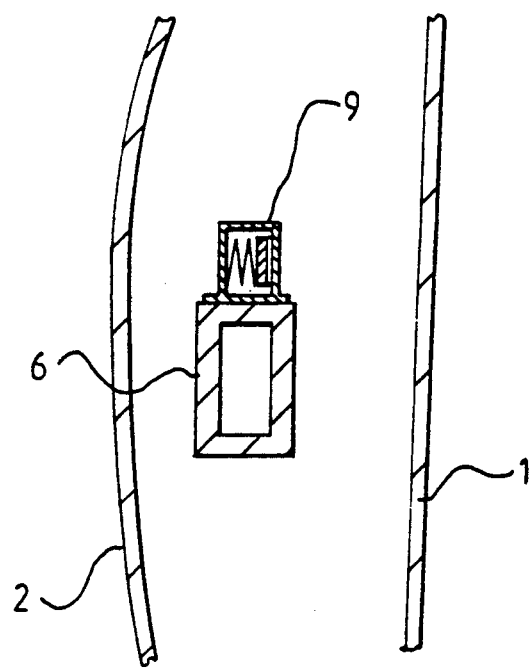
FIGURE 1
FIGURE 2

IMPACT DETECTOR

BACKGROUND OF THE INVENTION

THE PRESENT INVENTION relates to an impact detector and more particularly relates to an impact detector for use in detecting an impact on the side of a motor vehicle.

It has been proposed previously to provide impact detectors in motor vehicles to detect when a motor vehicle suffers from an impact. Such an impact detector may be used to activate a safety device within the motor vehicle such as a so-called "air-bag" or a safety-belt pretensioner.

Many of the prior proposed impact detectors detect any impact on the vehicle, but it has now been found that there is a need for impact detectors which specifically detect an impact on the side of a vehicle. Such impact detectors may be utilised to trigger specially located "air-bags" which can protect the driver of a vehicle, or a passenger in a vehicle, especially from a side impact.

German Specification DE-OS-3716168 discloses arrangements for detecting a side impact. In the arrangements disclosed in this Specification two elongate elements extend transversely across the door of a motor vehicle adjacent the outer skin of the door. In one embodiment the transversely extending elements are rigid and are mounted on Piezo electric transducers so that when the outer skin of the door is deformed, and touches the transverse members, the transducers generate appropriate signals. In an alternative embodiment the elongate transverse members comprise light guides which direct light from a photo diode to photo transistors, and again the arrangement is such that when the outer skin of the vehicle door engages the members, light is no longer transmitted through the members and thus appropriate signals can be generated. In each of these embodiments the speed of the deformation of the outer skin of the door is measured by determining the time lapse between two specific degrees of deformation, that is to say the degree of deformation when the outer skin engages the first transverse member and the subsequent degree of deformation when the skin of the door engages the second transverse member.

GB-A-2225660 discloses an alternative arrangement in which a pressure switch is actuated in response to deformation of the outer skin of the door.

It is to be noted that in the prior art arrangements discussed above it is the deformation of the outer skin of the door that is detected. It has now been found that such devices are not totally satisfactory, in that the devices respond to any deformation of the outer skin of the door. It is to be noted that conventionally the outer skin of the door of a motor vehicle is formed of a pressed steel sheet which is made to be as thin as possible. Thus this sheet will be deformed significantly by an impact which only possesses relatively low energy. For instance, the outer skin of the door of a motor vehicle can be significantly deformed by a high speed blow from a light item, such as a kick from a foot. Also, the outer skin of the door of a car can be significantly deformed if the door is brought into contact with a fixed object when the door is opened, as may happen when the car is parked immediately adjacent a lamp post or the like. The reason for this is that the outer skin of the door of the vehicle does not have any significant inherent strength and the degree of deformation in an impact is dependent upon the speed of impact and is almost independent of the energy of the impact. The present invention therefore seeks to provide an arrangement in which a passive sensor element is utilised which can make it possible to distinguish between a low energy impact, which would not be sufficient to warrant inflation of the special air-bag and a high energy impact which would make it appropriate to inflate the air-bag.

SUMMARY OF THE INVENTION

According to this invention there is provided a system for detecting a side impact in a motor vehicle, said system comprising at least one reinforcing element located adjacent or engaging the interior of the outer skin of the vehicle in the region of the side of the vehicle, and a sensor element arranged to provide an output signal, in response to a side impact of the vehicle, when or after the reinforcing element is deformed.

Preferably the reinforcing element is spaced from the outer skin.

The sensor element may be responsive to the distance of deformation of the reinforcing element, or the acceleration or speed of deformation of the reinforcing element.

Preferably the sensor is mounted adjacent that part of the reinforcing element which is remote from the outer skin of the vehicle and responds to movement of the reinforcing element.

Conveniently the sensor element is a pressure sensitive sensor element.

Preferably the sensor element is a Piezo electric sensor element.

In one embodiment the sensor element is mounted on the reinforcing element.

In an alternative embodiment the sensor element is mounted on a bracket, the bracket being mounted on the outer skin but engaging the reinforcing bar so that the sensor will not move until the reinforcing bar has moved.

In certain embodiments the sensor element may comprise an inertia mass held in position by means of a spring within a housing, movement of the mass relative to the housing operating a switch to provide an output signal.

In a further embodiment the sensor comprises an electric coil and a magnetised armature adapted to be mounted on the part of the reinforcing element facing away from the outer skin and on an element fixed in position so that movement of the reinforcing element causes the coil and the armature to move relative to each other to generate a current.

The system may be provided within a door of a motor vehicle.

BRIEF DESCRIPTION TO DRAWINGS

FIG. 1 is a diagrammatic vertical cross-sectional view taken a door of a car provided with an impact sensor in accordance with the invention, FIG. 2 is a part view corresponding to FIG. 1 showing an alternative embodiment of the invention, FIG. 3 is a part view corresponding to FIG. 1 showing another alternative embodiment of the invention, and FIG. 4 is another part view corresponding to FIG. 1 showing another embodiment of the invention.

DESCRIPTION OF PREFERRED EMBODIMENTS

Figure 4:
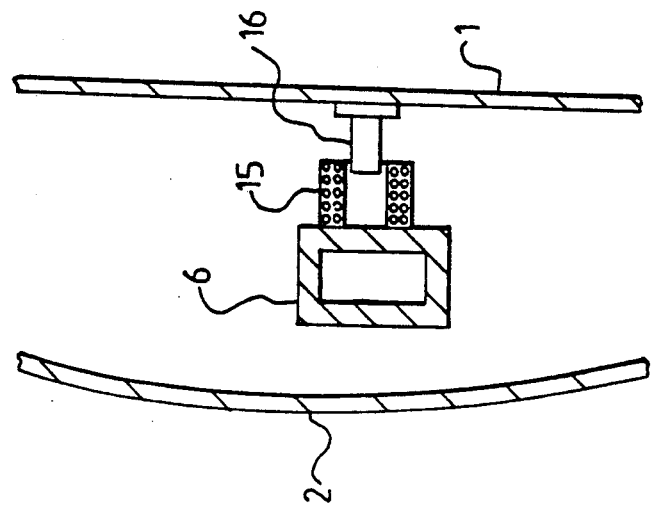

Referring to FIG. 1 a vehicle door provided with an impact sensor in accordance with the invention is illustrated schematically. The door consists of an inner skin 1, and an outer skin 2 which define between them a hollow interior 3 of the door. A window 4 is provided in the door and FIG. 1 illustrates the top part 5 of the frame which surrounds the window.

It is to be understood that the door may be of any conventional construction which is why the illustration only shows the door schematically.

Extending horizontally transversely of the door, at a substantially central position within the hollow interior 3 of the door is a substantially rigid reinforcing beam 6. The reinforcing bar may be made of any appropriate material. It is preferred that the reinforcing bar is located at a position spaced from the outer skin 2 of the door.

A frame-work or spider 7 mounted on the inner skin 1 of the door supports a sensor element 8 adjacent that surface of the horizontally extending reinforcing beam 6 which is facing towards the inner skin 1 of the door.

The sensor 8 may comprise a pressure switch or sensor, such as a sensor incorporating an element of Piezo electric material. If the sensor is of this type it will be appreciated that the sensor will only be activated when the reinforcing beam 6 is deformed to such an extent that the beam 6 contacts the sensor 8. Thus the sensor is primarily responsive to the distance of deformation of the reinforcing beam. This will only occur in a high energy impact, since a low energy impact will not be able to deform the relatively strong reinforcing beam 6.

In an alternative embodiment the sensor 8 may comprise a spring-and-mass sensor. In such a sensor a mass is held in a predetermined position by means of a spring. However, when the sensor moves the mass, due to its inertia, tends to remain stationary and moves against the bias of the spring. This means that the outer housing of the sensor thus moves relative to the mass. The strength of the spring is selected so that the mass only moves by a predetermined distance relative to the housing when subjected to a predetermined acceleration. This can either make or break an electric circuit. However, the sensor will only be subjected to such an acceleration subsequent to deformation of the beam 6 during a side impact, and thus again the sensor will only be activated when the door is subjected to a high energy impact. Thus, this embodiment has a sensor which responds primarily to the acceleration of the beam.

FIG. 2 corresponds to the central part of FIG. 1 and illustrates the inner skin 1, the outer skin 2 and the reinforcing beam 6 of the door. These features will thus not be re-described. However, in this embodiment of the invention, mounted on top of the reinforcing beam 6, is a sensor element 9. In this embodiment, the sensor element 9 is a spring and mass sensor element of the type mentioned above with reference to FIG. 1. Since the sensor element 9 is mounted on the transversely extending reinforcing beam, the sensor will only be actuated when the beam is deformed during a side impact.

Figure 3:
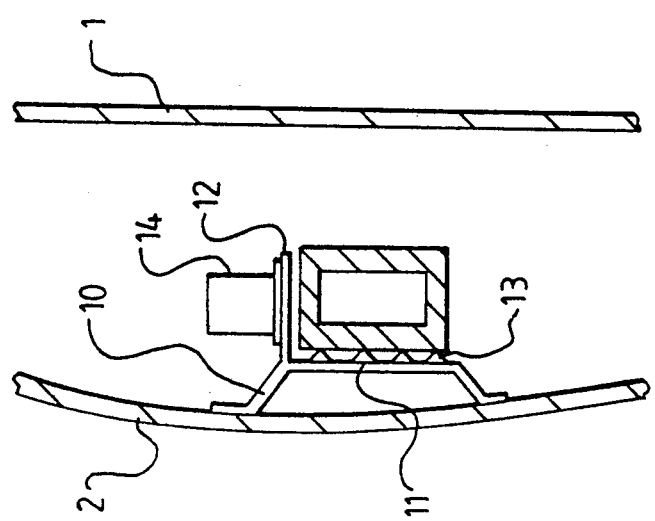

FIG. 3 again illustrates the central part of a door of a motor vehicle corresponding to that of FIG. 1, the inner skin 1, the outer skin 3 and the reinforcing beam 6 being illustrated. Mounted on the outer skin 2 is a frame-work 10 which supports a bracket having a vertical part 11 and a horizontal part 12. The vertical part of the bracket is adjacent the side of the transverse reinforcing beam 6 and the horizontal part is located immediately above the beam 6. A packing material or adhesive 13 is provided between the bracket components 11,12 and the horizontally extending reinforcing beam 6. Mounted on the horizontally extending portion 12 of the bracket is a sensor element 14 which may be a spring/mass sensor of the type disclosed above. Since the bracket defined by the portions 11 and 12 is located immediately adjacent the horizontally extending beam 6, when in an initial condition, even if the outer skin 2 of the door is deformed, the sensor 14 will not move, and will thus not provide an output signal. It is only when the outer skin 2 of the door has been deformed by a significant extent and the transversely extending beam 6 is being deformed that the sensor 14 can provide an output signal. The reason for this is that the sensor is located, as shown in FIG. 3, to the right of a vertical plane passing through the left-hand face of the reinforcing beam 6. Thus movement of the outer skin 2 of the door towards the beam 6 cannot activate the sensor 13 until the beam 6 is actually deformed.

FIG. 4 is another figure corresponding generally to FIGS. 2 and 3, showing the central part of a door having an inner skin 1 and an outer skin 2 and a horizontally extending reinforcing beam 6. Mounted on the reinforcing beam 6, on the side thereof facing towards the inner skin 1 of the door, is an electric coil 15 and mounted on the inner skin of the door is a magnetised armature or ion core 16 which is aligned with a central passage defined by the coil 15. It is to be understood that when the outer skin 2 of the door is deformed and the transversely extending reinforcing element 6 is deformed the coil 15 will move relative to the magnetised armature 16 causing a current to be induced in the coil 15. The magnitude of the current is responsive to the speed of deformation of the beam 6, and thus this sensor responds primarily to the speed of deformation of the reinforcing beam.

Whilst the invention has been described with reference to four specific embodiments it is to be appreciated that many modifications may be effected within the scope of the invention as defined by the following Claims. However, it is envisaged that in the most satisfactory embodiments of the invention the sensor element will be located, relative to the outer skin of the door of the motor vehicle, beyond a vertical plane which includes the part of the reinforcing bar which is located closest towards the outer skin of the door of the motor vehicle.

Whilst the invention has been described with reference to the door of a motor vehicle it is to be appreciated that sensors as described above may be mounted to locate impacts at other positions on the side of a vehicle, for example, in the region of the front wing and in the region of the rear of the vehicle. In each case, a reinforcing bar is provided located adjacent, but spaced from, the outer-most skin of the side of the vehicle.

What is claimed is:

1. A system for detecting a side impact in a motor vehicle, said system comprising:
   at least one reinforcing bar located adjacent to or engaging with the interior of an outer skin of the vehicle in the region of a side of the vehicle, and
   a sensor element for providing an output signal in response to a side impact of the vehicle whenever the reinforcing bar is deformed, the sensor element being located relative to the outer skin of the vehicle, inward of a vertical plane which includes the part of the reinforcing bar located closest to or engaging with the outer skin of the vehicle.

2. A system according to claim 1 wherein the reinforcing bar is spaced from the outer skin.

3. A system according to claim 1 wherein the sensor is responsive to the distance or deformation of the reinforcing bar.

4. A system according to claim 1 wherein the sensor is responsive to the acceleration of the deformation of the reinforcing bar.

5. A system according to claim 1 wherein the sensor is responsive to the speed of deformation of the reinforcing bar.

6. A system according to claim 1 wherein the sensor is mounted adjacent that part of the reinforcing bar which is remote from the outer skin of the vehicle and response to movement of the reinforcing bar.

7. A system according to claim 6 wherein the sensor element is a pressure sensitive sensor element.

8. A system according to claim 6 wherein the sensor element is a Piezo electric sensor element.

9. A system according to claim 1 wherein the sensor element is mounted on the reinforcing bar.

10. A system according to claim 1 wherein the sensor element is mounted on a bracket, the bracket being mounted on the outer skin but engaging the reinforcing bar so that the sensor will not move until the reinforcing bar has moved.

11. A system according to claim 1 wherein the sensor element comprises an inertial sensor having an inertia mass held in position by means of a spring within a housing, movement of the mass relative to the housing operating to one of make or break an electrical circuit and thereby provide an output signal.

12. A system according to claim 1 wherein the sensor comprises an electric coil and a magnetized armature adapted to be mounted on the part of the reinforcing bar facing away from the outer skin and on an element fixed in position so that movement of the reinforcing bar causes the coil and the armature to move relative to each other to generate a current.

13. A system according to claim 1 provided within a door of a motor vehicle.

14. An impact detection apparatus for detecting an impact on an outer surface of a body shell, comprising:
   a rigid reinforcing member disposed inside the body shell adjacent to an inner surface of the body shell; and
   sensor means, disposed in close proximity with the reinforcing member inside the body shell, for sensing deformation of the reinforcing member and providing an output indicative thereof.

* * * * *